US007626662B2

(12) United States Patent
Lee et al.

(10) Patent No.: US 7,626,662 B2
(45) Date of Patent: Dec. 1, 2009

(54) METHOD FOR FABRICATING LIQUID CRYSTAL (LC) ALIGNMENT

(75) Inventors: Chin-Yang Lee, Hsinchu (TW); Huang-Chin Tang, Hsinchu (TW); Kei-Hsiung Yang, Hsinchu (TW); Chih-Wei Chen, Hsinchu (TW); Chi-Hung Liu, Hsinchu (TW); Yu-Jung Shih, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/882,652

(22) Filed: Aug. 3, 2007

(65) Prior Publication Data

US 2008/0030673 A1    Feb. 7, 2008

Related U.S. Application Data

(63) Continuation-in-part of application No. 11/585,833, filed on Oct. 25, 2006, now abandoned.

(30) Foreign Application Priority Data

Aug. 1, 2006    (TW)    ............................... 95128093 A

(51) Int. Cl.
G02F 1/1337    (2006.01)

(52) U.S. Cl. ...................... 349/124; 349/123; 349/125; 349/126; 349/127; 349/128; 349/129; 349/132; 349/133; 349/134; 349/187; 250/423 R

(58) Field of Classification Search ......... 349/123–129, 349/132–136, 187; 250/423
See application file for complete search history.

(56) References Cited

U.S. PATENT DOCUMENTS

| 6,632,483 | B1 * | 10/2003 | Cesare Callegari et al. .. | 427/526 |
| 6,967,340 | B2 * | 11/2005 | Lee et al. ............... | 250/492.21 |
| 7,425,710 | B2 * | 9/2008 | Liu et al. ................. | 250/423 F |
| 2002/0001057 | A1 * | 1/2002 | Chaudhari et al. .......... | 349/124 |

FOREIGN PATENT DOCUMENTS

CN    1804704    7/2006

* cited by examiner

*Primary Examiner*—Brian M. Healy
*Assistant Examiner*—Guy G Anderson
(74) *Attorney, Agent, or Firm*—Rabin & Berdo, P.C.

(57) ABSTRACT

A method for fabricating liquid crystal (LC) alignment includes the steps of processing an alignment film having a plurality of liquid crystal molecules with a single or plurality of plasma generating devices, such that the liquid crystal molecules are aligned at a high pretilt angle. Compared with the prior art, the present invention is suitable for modifying the alignment film surface adjustablely in directions and angles, and can attain the effect of alignment stability with a high pretilt angle in a single process, thus overcoming the drawbacks of the prior art.

16 Claims, 8 Drawing Sheets

METHOD FOR FABRICATING LIQUID CRYSTAL (LC) ALIGNMENT

CROSS-REFERENCE TO RELATED APPLICATIONS

This application is a Continuation-In-Part of U.S. patent application, Ser. No. 11/585,833, filed Oct. 25, 2006 now abandoned, which claimed priority from Taiwanese application No. 095128093, filed Aug. 1, 2006.

BACKGROUND OF THE INVENTION

1. Field of the Invention

The present invention relates to substrate surface alignment techniques and, more particularly, to a method for fabricating liquid crystal (LC) alignment.

2. Description of the Prior Art

With the advances in Internet and video technology, use of flat panel displays is becoming more important and essential to people's daily life. Unlike conventional CRT panel televisions, liquid crystal displays (LCD) have advantages, such as light, compact, full-color display, radiation-free, digital, high-definition, and power-saving, and thus liquid crystal displays seemingly become the potential mainstream flat panel displays of the next generation.

For liquid crystal displays, the transmission paths and phases of light are altered through the control over the geometric changes of liquid crystals by electric field. With polarizers, liquid crystal displays achieve contrast, which, coupled with driving circuits and color filters, account for the gray scale and colors displayed. In this regard, liquid crystal (LC) alignment technique plays an important, key role in a liquid crystal panel process. The liquid crystal alignment process is not only crucial to the control of the arrangement and alignment of liquid crystals but also indispensable to high-quality display features, such as viewing angle, response time, contrast, and color.

With the advances in the liquid crystal display process technology and the decrease in product costs, it is foreseeable that in the near future liquid crystal display television (LCD TV) will become an information appliance (IA) indispensable to every family. Hence, manufacturers nowadays are devoted to LCD TV research. At present, there are two intractable issues about the liquid crystal displays for use in TV, namely wide viewing angle and short response time.

Major wide-angle technologies in use are, namely Twisted Nematic (TN), Super Twisted Nematic (STN), Multi-domain Vertical Alignment (MVA), and In-Plane Switching (IPS). Unsatisfied with the existing response time, some propose the Optically Compensated Bend (OCB) technique. With the OCB technique, both wide viewing angle and short response time are achievable goals. As regards wide viewing angle, in the presence of an optimized retarder, the viewing angle can be increased to 140° vertically and 160° horizontally, and the response time is less than 7 ms for full gray scale and even less than 3 ms for 15.2″ panel. Besides, inasmuch as the OCB technique enables liquid crystal molecules to be disposed in an arch-shaped pattern, animations with little image sticking can be displayed even at low temperature, and the response time is as short as 40 ms even at a low temperature as low as −20° C., and thus OCB-mode LCD is ten times faster than other types of LCD in terms of low-temperature response time.

Despite its advantages like wide viewing angle and short response time, OCB-mode LCD does have its own drawbacks. For instance, in order to switch an alignment state of liquid crystal molecules from splay alignment to bend alignment, and allow the liquid crystal molecules to continue with the bend alignment without returning to radial alignment, the liquid crystal molecules have to be aligned at different pretilt angles in accordance with their respective compensated angles, and thus splay-bend transition takes place. Owing to the elastic energy of liquid crystal molecules, formation of splay alignment is fast. However, once the bend alignment starts to recur, those liquid crystal molecules with relatively high pretilt angles (for example, from 45° to 55°) will become unstable, which is exactly the point where there is the greatest difficulty in mass production based on the OCB technique.

In order to solve the aforesaid problem, related technologies in use involve using a combination of vertical polymer alignment film and horizontal polymer alignment film to fabricate a microstructured surface. In order to solve interface-related problems arising from the combination of two markedly different polymers, the related technologies in use involves providing a substrate 5 formed with a conductive layer 51 and an alignment film 53 as shown in FIG. 7A, and performing an alignment rubbing process on the alignment film 53 with a view to aligning liquid crystal molecules as shown in FIG. 7B, such that the liquid crystal molecules are aligned in the same direction as shown in FIG. 7C.

However, alignment rubbing is unreliable whenever a high pretilt angle is involved. In the alignment rubbing process, rubbing of alignment film brings about dust, electrostatic charges, and rubbing defects, thus reducing the yield and the reliability of the process. Hence, there is still room for improvement in the prior art.

For the aforesaid reasons it is highly desirable to develop non-rubbing alignment techniques. Non-rubbing alignment research nowadays is mainly directed to three techniques, namely photoalignment, ion beam alignment, and plasma beam alignment.

Photoalignment is good at homogeneity, but it has technical bottleneck which calls for a breakthrough in such areas as anchoring energy and image sticking. Also, its stability depends on the life of the bulb of the exposure equipment used as well as flashing of a light source.

Ion beam alignment technology requires high-vacuum equipment and electrostatic charge removing equipment and therefore incurs high costs, not to mention that the life of the ion gun used remains an intractable problem. Hence, at the present moment ion beam alignment technology is still limited to laboratories.

Referring to FIG. 8, plasma beam alignment technology involves generating a single plasma beam 61 by a single plasma generating device 6 disposed in a process space, and scanning to and fro an alignment film of a substrate 63 vertically so as to achieve alignment. Although products manufactured by plasma beam alignment technology are almost up to standard, their mass production is faced with such problems as a long process and poor adjustment of direction, because a single plasma generating device has to scan an alignment film to and fro. Besides, scanning back and forth generates vibration that brings about the instability of a process.

Accordingly, an issue calling for urgent solution involves coping with the problems facing the prior art.

SUMMARY OF THE INVENTION

In light of the aforesaid drawbacks of the prior art, it is a primary objective of the present invention to provide a method for fabricating liquid crystal alignment so as to stabilize a high pretilt angle.

Another objective of the present invention is to provide a method for fabricating liquid crystal alignment in such a way as to facilitate mass production.

Yet another objective of the present invention is to provide a method for fabricating liquid crystal alignment in such a way as to enhance process stability.

In order to achieve the above and other objectives, the present invention provides a method for fabricating liquid crystal alignment. The method comprises the steps of providing a substrate, forming on the substrate an alignment film comprising aligned liquid crystal molecules, and providing plasma beams adjustablely in directions and angles to modify the alignment film such that the liquid crystal molecules of the alignment film on the substrate are aligned uniformly and regularly and have a stable high pretilt angle.

The alignment film is an organic film, an inorganic film, or an organic-inorganic hybrid film. In a preferred embodiment, the substrate is moved unidirectionally for modifying the alignment film by the plasma beams provided adjustablely in directions and angles. In another preferred embodiment, the plasma beams are moved unidirectionally for modifying the alignment film by the plasma beams provided adjustablely in directions and angles.

Preferably, a plurality of plasma generating devices generate the plasma beams provided adjustablely in directions and angles for modifying the alignment film. Preferably, the plasma beams generated by the plasma generating devices and provided adjustablely in directions and angles move relatively to the substrate in order to modify the alignment film. Alternatively, modification of the alignment film is performed on the substrate disposed adjustablely in directions and angles by moving the plasma beams unidirectionally. Alternatively, modification of the alignment film is performed on the substrate disposed adjustablely in directions and angles by means of the relative movement between the substrate and the plasma beams generated by the plasma generating devices.

The plasma generating devices generate the plasma beams by means of an anode layer, a corona discharge, a plasma glow discharge, a plasma jet, a plasma torch, a surface dielectric barrier discharge, a coplanar diffuse surface discharge, or a ferroelectric discharge. A process gas for generating plasma sources by the plasma generating devices comprises air, dry air, hydrogen, oxygen, nitrogen, argon, steam, and helium. The process gas is an ionized gas produced at standard atmospheric pressure or in a vacuum. The plasma sources are generated at standard atmospheric pressure or in a vacuum, that is, at pressure ranging from 760 to $1\times10^{-5}$ Torr. The plasma sources comprise the high-energy plasma beams. Of course, the plasma sources comprise at least two selected from the group consisting of electrons, ions, radicals, and neutral particles.

The method further comprises forming a conductive layer on the substrate in advance; the substrate is a glass substrate, and the conductive layer is made of indium tin oxide (ITO). The substrate is, more particularly, a glass substrate used in liquid crystal panels. Of course, in any other embodiment, the substrate can be either a plastic substrate or a flexible metal substrate. The liquid crystal molecules of the alignment film are aligned by Rubbing Alignment, Vertical Alignment, Twisted Nematic (TN), Super Twisted Nematic (STN), Multi-domain Vertical Alignment (MVA), In-Plane Switching (IPS), Optically Compensated Bend (OCB), or Ferroelectric Liquid Crystal (FLC).

Unlike the prior art, the present invention discloses a method for fabricating liquid crystal alignment. The method involves modifying the surface of an alignment film, using high-energy plasma beams generated by a plurality of plasma generating devices and generated adjustablely in directions and angles, thus allowing liquid crystal molecules of the alignment film to have a stable high pretilt angle ranging from 0° to 90°. Unlike the prior art which is faced with mass production problems arising from its failure to provide thorough and stable bend alignment, the present invention solves the mass production problems. And further, the present invention provides not only a method for fabricating liquid crystal alignment in such a way as to stabilize a high pretilt angle but also an alignment system applicable to the method and conducive to fast alignment.

With a plurality of plasma generating devices (multi-sources) disposed inside a process space of a machine, alignment is rapidly achieved by scanning which is performed once only. As a result, the process can be short enough to be conducive to mass production. The prior art is faced with an instability problem arising from vibration generated by a plasma generating device which scans an alignment film back and forth; by contrast, the present invention solves the instability problem and thereby enhances process stability.

BRIEF DESCRIPTION OF THE DRAWINGS

FIGS. 4A and 4B are schematic views illustrating the relative positions of substrates and plasma beams in the second preferred embodiment, wherein FIG. 4A shows the substrates joining each other at an angle, and FIG. 4B shows the substrates aligned in parallel;

FIGS. 5A and 5B are schematic views illustrating the relative positions of substrates and plasma beams in the third preferred embodiment, wherein FIG. 5A shows the substrates disposed outside a plasma generating device and delivered at right angle, and FIG. 5B shows the substrates disposed outside a plasma generating device and delivered in a circle;

DETAILED DESCRIPTION OF THE PREFERRED EMBODIMENT

The present invention is herein illustrated with a specific embodiment so that one ordinarily skilled in the pertinent art can easily understand other advantages and effects of the present invention from the disclosure of the invention. In this embodiment, both a method for fabricating liquid crystal alignment and an alignment system applicable to the method are illustrated with liquid crystal displays used in television sets, which is understandably not supposed to limit the present invention. The alignment method which features a high pretilt angle may be applied to bistable LCDs and e-book displays. Accordingly, whatever described below regarding the embodiment are merely illustrations exemplary of the present invention.

Figure 1A:
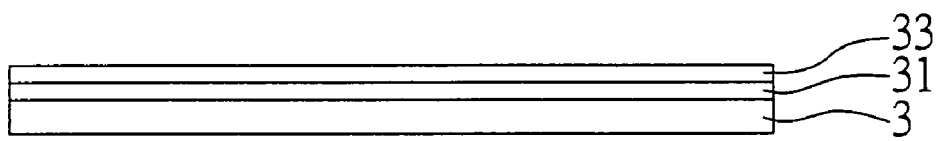
FIGS. 1A to 1C are schematic views illustrating a method for fabricating liquid crystal alignment in accordance with the preferred embodiment of the present invention.
Figure 1B:
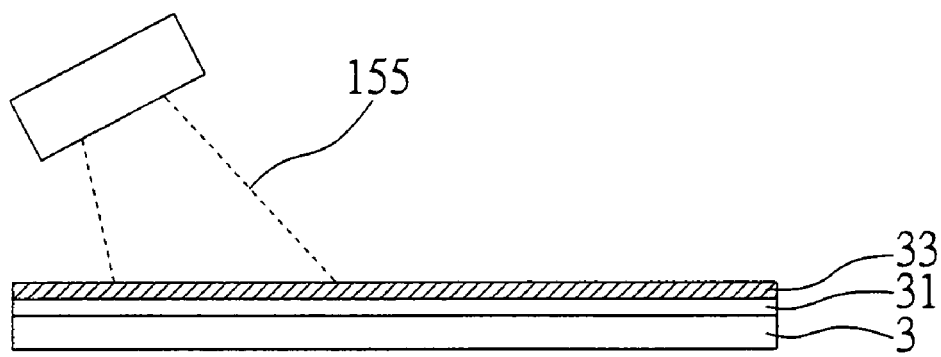
Figure 1C:
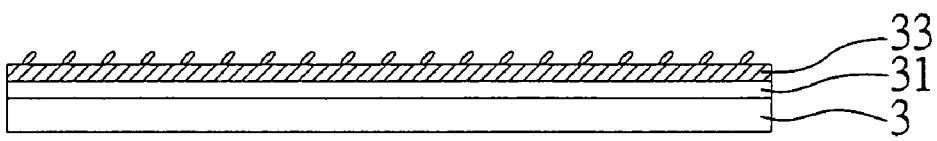
Figure 2:
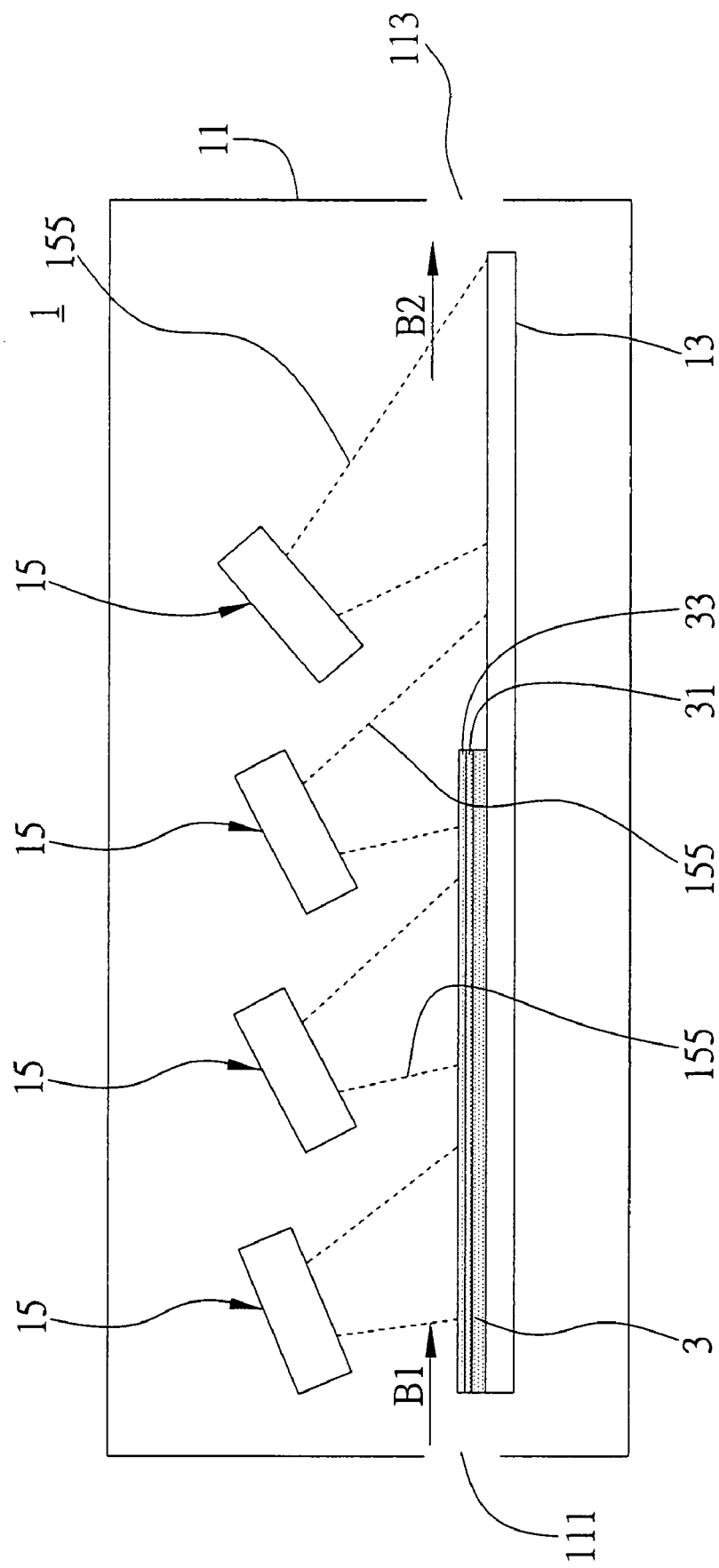
FIG. 2 is a schematic view showing an alignment system applicable to a method for fabricating liquid crystal alignment in accordance with the preferred embodiment of the present invention and, more particularly, showing how to implement the method for fabricating liquid crystal alignment.
Figure 3:
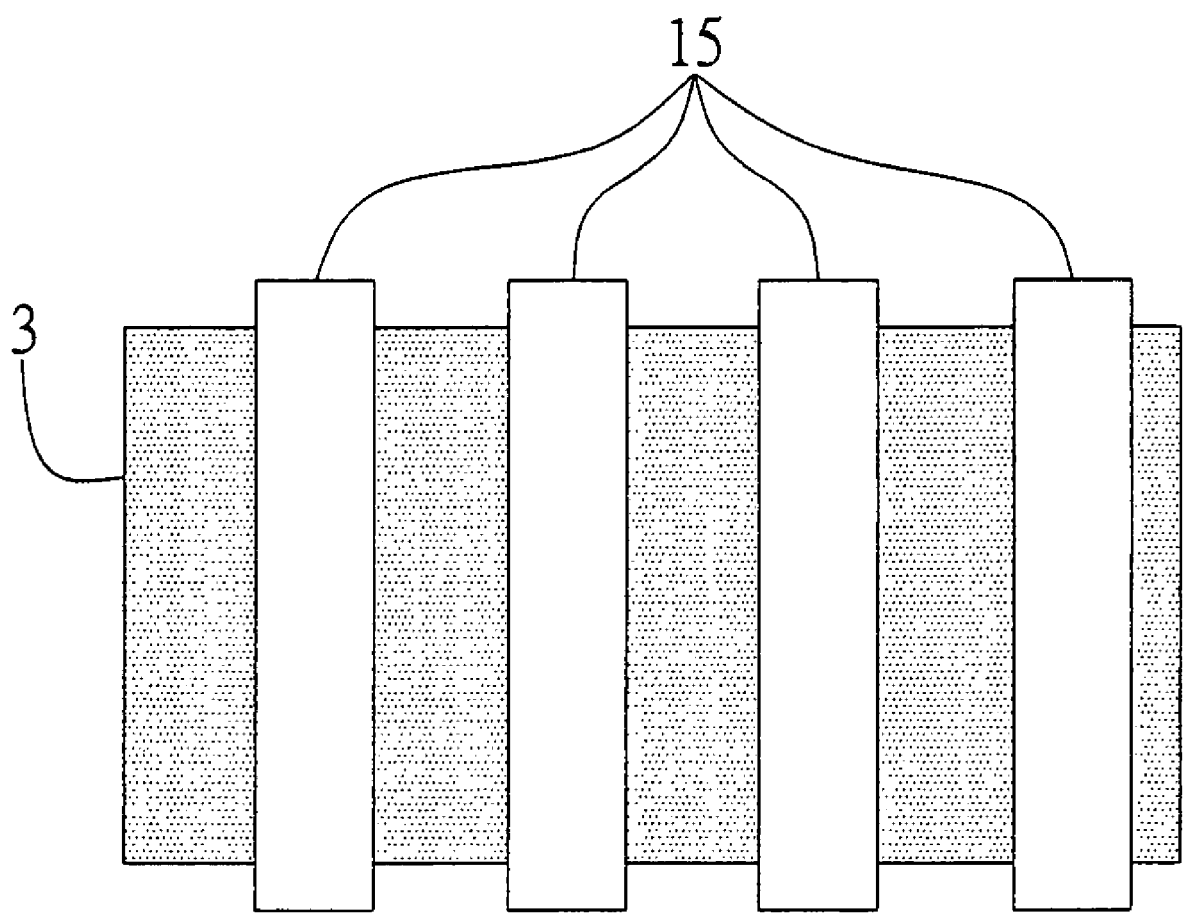
FIG. 3 is a schematic view showing a substrate and plasma beams aligned in parallel.

FIGS. 1 to 3 are drawings of the preferred embodiment of the present invention. Referring to FIGS. 1A to 1C, which are schematic views showing a method for fabricating liquid crystal alignment in accordance with the preferred embodiment of the present invention.

Referring to FIG. 1A, the present invention discloses a method for fabricating liquid crystal alignment, wherein the method comprises the steps of providing a substrate 3, and forming a conductive layer 31 and an alignment film 33 on the substrate 3.

In this embodiment, the substrate 3 is a glass substrate for use in a liquid crystal panel, and the conductive layer 31 is made of indium tin oxide (ITO). In other words, the substrate 3 with the conductive layer 31 disposed thereon is an ITO glass substrate. But the conductive layer 31 is merely one exemplary of its kind, as any other conductive layer applicable to a display can be the alternative. Of course, whoever ordinarily skilled in the art can understand that the substrate 3 with the conductive layer 31 includes, but is not limited to, the glass substrate disclosed in this embodiment, and that substrates with conductive layers made of various materials, such a plastic substrate, a flexible metal substrate, and any appropriate substrate, can be used in any other embodiment.

The alignment film 33 comprises liquid crystal molecules which are aligned, for example, by Vertical Alignment, Twisted Nematic (TN), Super Twisted Nematic (STN), Multi-domain Vertical Alignment (MVA), In-Plane Switching (IPS), or any other equivalent means. Insomuch as modification of an alignment film comprising aligned liquid crystal molecules is characterized by easy control of tilt angles (0° to 90°) and photoelectric property of liquid crystal molecules by means of process parameters, this embodiment involves forming the alignment film 33 having, for example, vertically aligned liquid crystal molecules on the substrate 3.

The alignment film 33 is an organic film, an inorganic film, or an organic-inorganic hybrid film, comprising organic compounds such as polyimide, acrylic, and polyvinyl cinnamate, and inorganic compounds such as glass, quartz, gold, indium tin oxide (ITO), silicon, silicon nitride, hydrogenated amorphous silicon, hydrogenated amorphous carbon (a-C:H), diamond-like carbon (DLC), silicon oxide ($SiO_x$), aluminum trioxide ($Al_2O_3$), cerium dioxide ($CeO_2$), tin oxide ($SnO_2$), zinc titanium oxide ($ZnTiO_2$), and indium titanium oxide ($InTiO_2$). Depositing the alignment film 33 on the conductive layer 31 of the substrate 3, rubbing alignment, and vertical alignment are techniques which belong to the prior art and thereby are known, and thus they are not herein described in detail.

Referring to FIG. 1B, the alignment film 33 is modified by plasma beams 155 provided adjustablely in direction and angle, such that liquid crystal molecules of the alignment film 33 on the substrate 3 are aligned uniformly and regularly and have a stable high pretilt angle, as shown in FIG. 1C.

Referring to FIG. 2, an alignment system 1 modifies the surface of the alignment film 33 adjustablely in direction and angle. The alignment system 1 comprises a machine equipped with process space 11, a substrate delivering mechanism 13 disposed in the process space 11, and a plurality of plasma generating devices 15 opposite to the substrate delivering mechanism 13.

The process space 11 comprises a first opening 111 and a second opening 113 opposing to the first opening 111. In this embodiment, the first opening 111 serves as an inlet, and the second opening 113 serves as an outlet. Although in this embodiment the process space 11 of the machine is a single chamber, in any other embodiment the process space 11 can comprise consecutive chambers, that is, a plurality of process spaces 11 communicating with one another, to allow for changes of direction in light of the size of a factory.

The substrate delivering mechanism 13 is disposed beneath the process space 11 and configured to deliver the substrate 3 so as to perform alignment. Considering that the substrate delivering mechanism 13 can be any delivering mechanism designed to convey a substrate, and that related delivering mechanisms are in wide use for industrial purposes, the substrate delivering mechanism 13 is apprehensible to persons ordinarily skilled in the art and therefore is not described herein in detail.

The plasma generating devices 15 for generating plasma beams adjustablely in directions and angles (to be described later) are disposed in the process space 11 and arranged above the substrate delivering mechanism 13 with a view to modifying the alignment film 33. In this embodiment, the plasma generating devices 15 are tilted at adjustable angles if necessary and are oriented at from 0°p to 90° to the normal of the surface of the substrate 3, such that eventually the liquid crystal molecules of the alignment film 33 are tilted at from 0° to 90°.

The plasma generating devices 15 are with same or different energy levels and angles and generate different plasma beams 155, depending on the energy levels. In this embodiment, the outbound plasma beams 155 are supplied by high-energy plasma sources generated by the plasma generating devices 15 at standard atmospheric pressure or in a vacuum (ranging from 760 to $1 \times 10^{-5}$ Torr). The plasma generating devices 15 are tilted at adjustable angles, depending on related functional requirements. More particularly, the plasma generating devices 15 are tilted at angles ranging from 0° to 90° and thereby are perpendicular, oblique (at any angle), or rotatable (at any angle) relatively to the substrate 3, depending on the related functional requirements, rather than solely in the directions or angles specified in this embodiment.

In this embodiment, the plasma generating devices 15 comprise an anode layer, for example. Referring to FIG. 3, viewing from the substrate 3, the plasma generating devices 15 are arranged in parallel or alternately. In other embodiments, the plasma generating devices 15 are disposed in the process space 11 and arranged at least in parallel, in series, or alternately, rather than solely in a way specified in this embodiment.

The outbound plasma beams 155 are supplied by high-energy plasma sources generated by the plasma generating devices 15. In this embodiment, the plasma sources comprise at least two selected from the group consisting of electrons, ions, radicals, and neutral particles. In any other embodiment, the plasma sources comprise ones selected from the group consisting of electrons, ions, radicals, and neutral particles. A process gas for generating the plasma sources by the plasma generating devices 15 is, for example, air, dry air, hydrogen, oxygen, nitrogen, argon, steam, helium, and any other gas likely to be ionized and turned into plasma in the aforesaid environment under the aforesaid pressure.

In this embodiment, the process space 11 is subjected to a pressure ranging from 760 to $1 \times 10^{-5}$ Torr, or, in other words, the plasma sources are generated at standard atmospheric pressure or in a vacuum, that is, at pressure ranging from 760 to $1\times10^{-5}$ Torr. The plasma generating devices 15 are disposed at from 0° to 90° to the normal of the surface of substrate 3 and then modify the alignment film 33 adjustably in direction and angle, such that eventually the liquid crystal molecules of the alignment film 33 are tilted at from 0° to 90°. Upon plasma-based modification, the surface of the alignment film 33 acquires a stable pretilt angle of 8 to 10°, allowing optically compensated bend (OCB) crystals to switch from splay mode to bend mode swiftly. Time-dependent decay of alignment of liquid crystal molecules tilted at a great angle (for example, 45° to 55°) is prevented.

Although the alignment system 1 in this embodiment is intended for liquid crystal alignment, the alignment system 1 can also be used for any other industrial purposes associated with mass production, for example, oblique deposition, protective over-coating, substrate cleaning, ion-assisted deposition, optical coating, sputtering processing, PCB cleaning, and thrusters for space technology, provided that process-required plasma beam concentration and divergence angles meet parameter optimization standards and enable maximum treatment efficiency.

The energy levels of the plasma generating devices 15 can be changed for different purposes, namely liquid crystal alignment, cleaning, deposition, heating, annealing, and surface modification. Plasma divergence angles of the plasma generating devices 15 can be adjusted when necessary, in order to achieve plasma source collimation to different extents. For instance, plasma divergence angles of the plasma generating devices 15 can be adjusted, by altering the structure of the plasma generating devices 15 or by connecting an external device to the plasma generating devices 15.

Compared to the prior art, this embodiment involves moving the substrate 3 unidirectionally and modifying the alignment film 33 by the alignment system 1 disposed adjustably in direction and angle. As a result, intended alignment quality can be achieved solely in a single process in which the substrate 3 is scanned by the plasma generating devices 15 at a specific speed through adjustment of process parameters, such as vacuity of the process space 11, gas flow (for example, 5 to 100 sccm), distance between the plasma generating devices 15, angle and energy, voltage (for example, 200 to 800V), pretilt angle, and treatment time (5 to 150 sec). Hence, the present invention shortens a process, speeds up mass production, and enhances process stability. Of course, moving a substrate back and forth can also be a process feature in any other embodiment.

This embodiment involves modifying the alignment film 33 by the plasma generating devices 15 disposed adjustably in direction and angle, such that liquid crystal molecules of the alignment film 33 formed on a substrate are aligned uniformly and regularly and a stable high pretilt angle is achieved in a single process. Of course, in order to prevent alignment decay and alignment instability, surface passivation treatment is performed by the introduction of a hydrogen-containing gas during or after the alignment process, as hydrogen atoms saturate the dangling bonds brought about by plasma beams, thus enhancing alignment stability, and keeping unstable chemical bonds in the alignment film intact, thus providing the alignment film 33 with a stable pretilt angle.

Figure 4A:
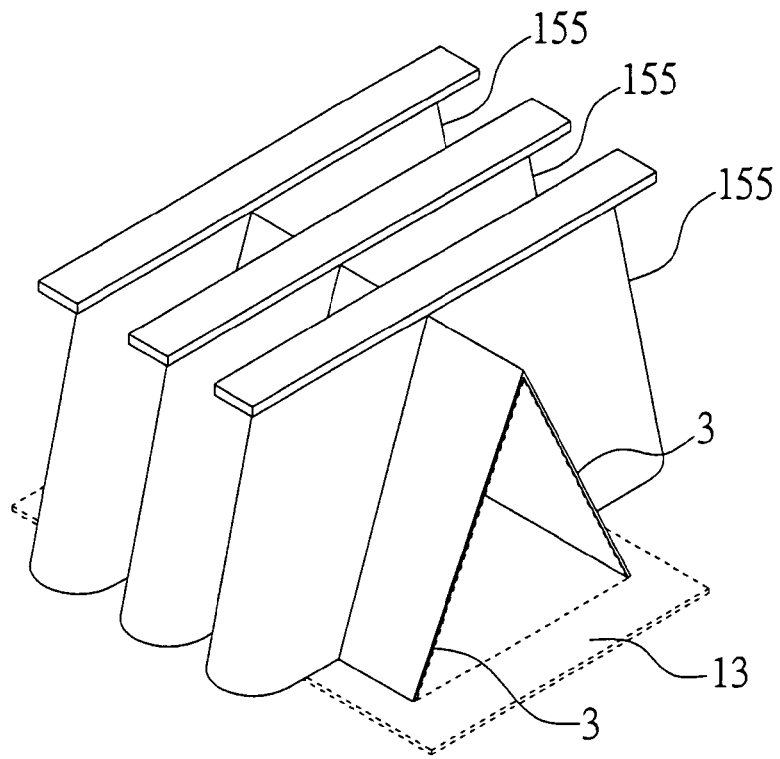
Figure 4B:
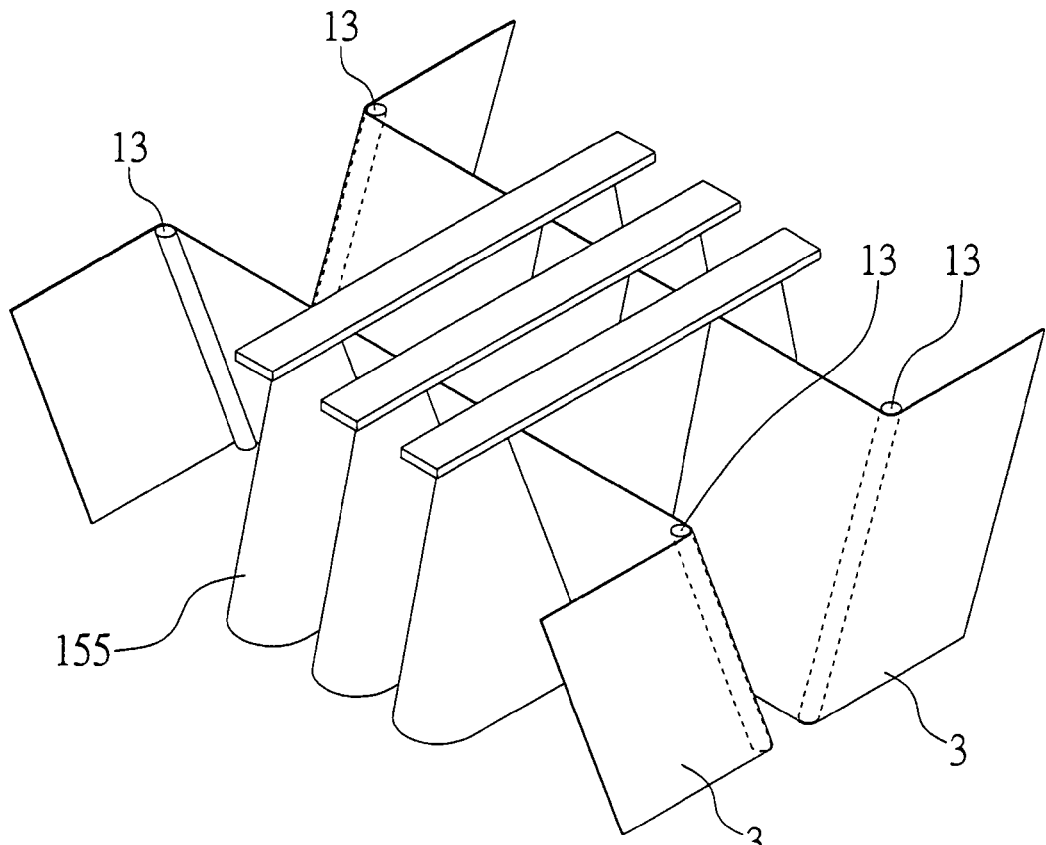

Referring to FIGS. 4A and 4B, which are schematic views illustrating the relative positions of substrates and plasma beams in the second preferred embodiment, wherein FIG. 4A shows the substrates joining each other at an angle, and FIG. 4B shows the substrates aligned in parallel, the distinguishing features of the second preferred embodiment are as follows. The substrate delivering mechanisms 13 are capable of delivering a plurality of substrates 3 while concurrently aligning the alignment film 33 of the substrates 3 by means of the plasma beams 155, wherein the substrates 3 may be parallel to the alignment system, perpendicular to the alignment system, perpendicular to the plasma beams 155, tilting at an angle relative to the plasma beams 155, parallel to one another, or forming an angle among the substrates 3.

Figure 5A:
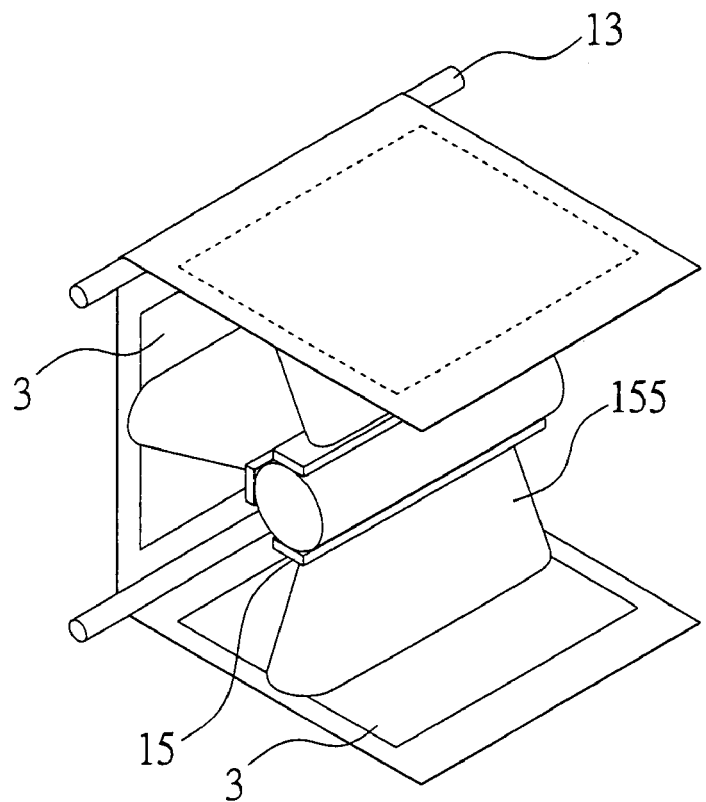
Figure 5B:
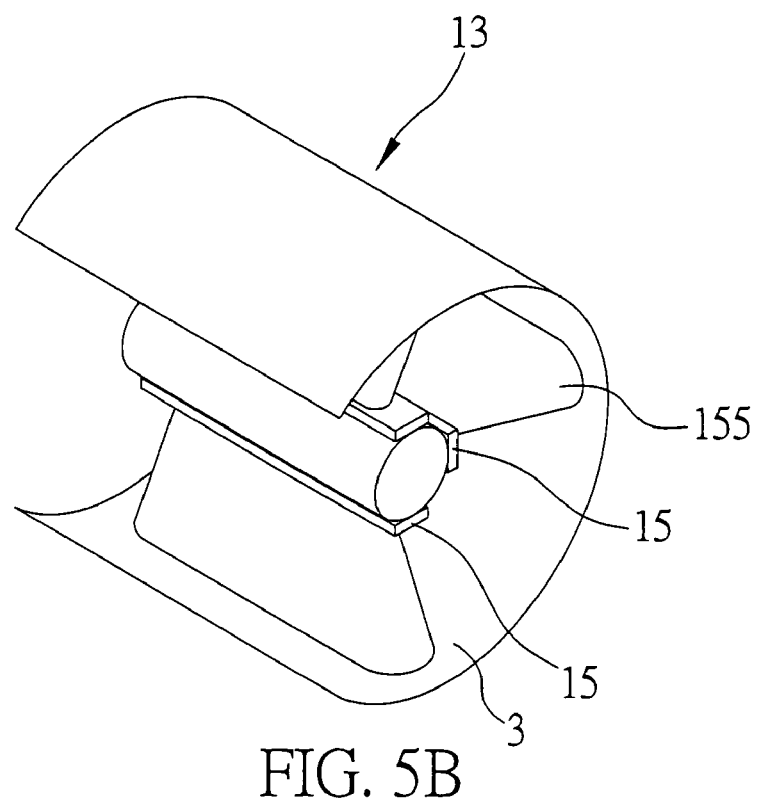

Referring to FIG. 5A, which is a schematic view illustrating the relative positions of substrates and plasma beams in the third preferred embodiment, the distinguishing features of the third preferred embodiment are as follows. The substrate delivering mechanisms 13 deliver the flexible substrates 3 such that the substrates 3 surround the centrally disposed plasma generating devices 15. In other words, in the third preferred embodiment, the plasma beams 155 generated by the centrally disposed plasma generating devices 15 align the peripherally disposed alignment film 33 continuously, and thus delivering the substrates 3 peripherally by the substrate delivering mechanisms 13 is sufficient for alignment of the alignment film 33 to take place. Also, the angles and tilt angles of the plasma beams 155 in the third embodiment can be conveniently adjusted, by rotating the plasma beams 155. Referring to FIG. 5B, the substrate delivering mechanisms 13 in the third embodiment can be disposed around, rather than perpendicularly to, the plasma generating devices 15.

Figure 6:
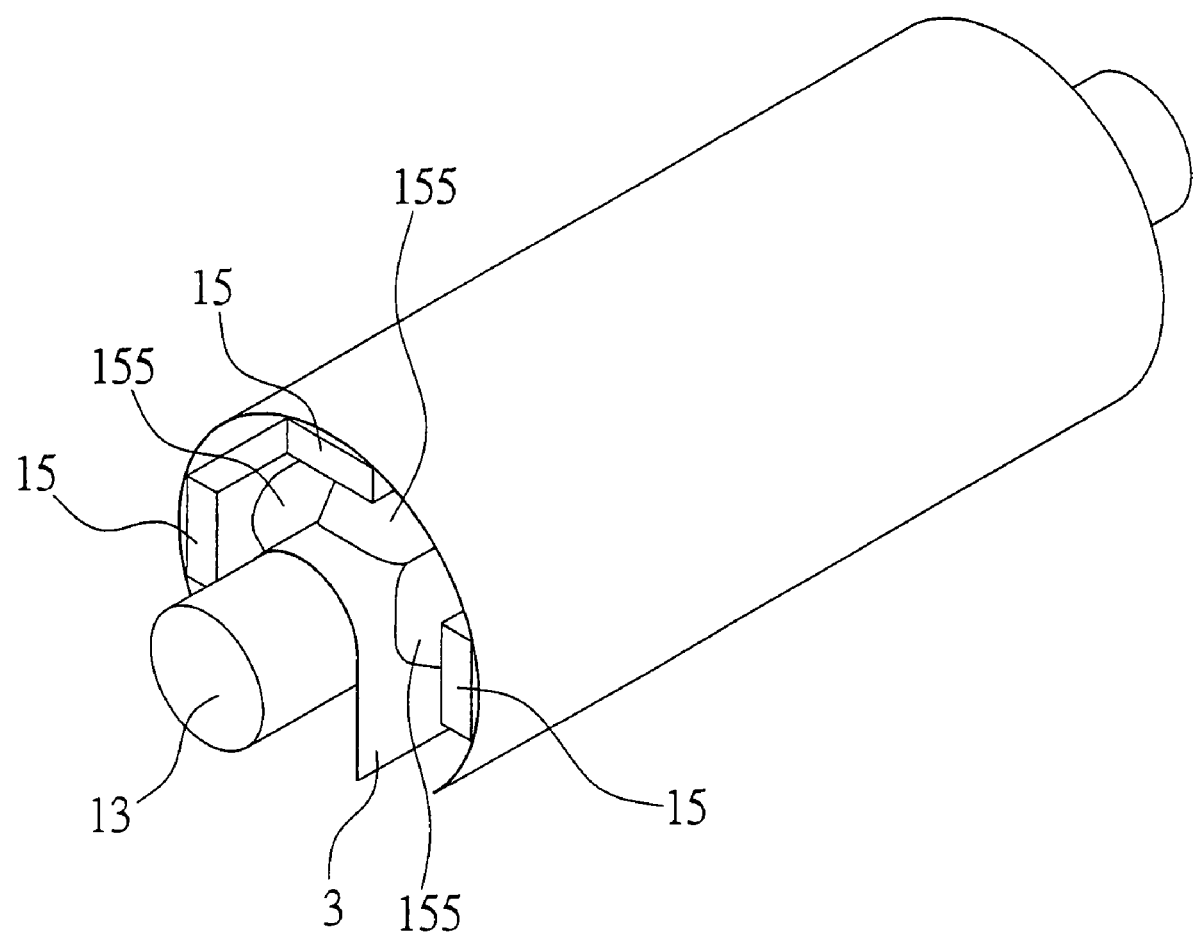
FIG. 6 is a schematic view showing a method for fabricating liquid crystal alignment and an alignment system applicable to the method in accordance with the fourth preferred embodiment of the present invention.
Figure 7A:
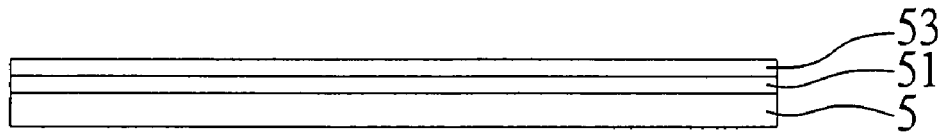
FIGS. 7A to 7C (PRIOR ART) are schematic views illustrating a known method for fabricating liquid crystal alignment.
Figure 7B:
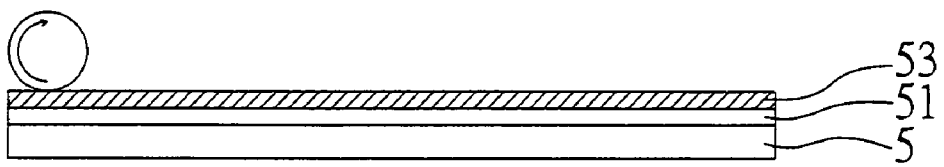
Figure 7C:
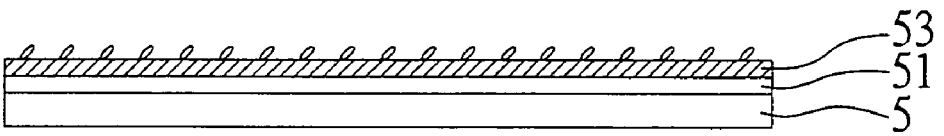
Figure 8:
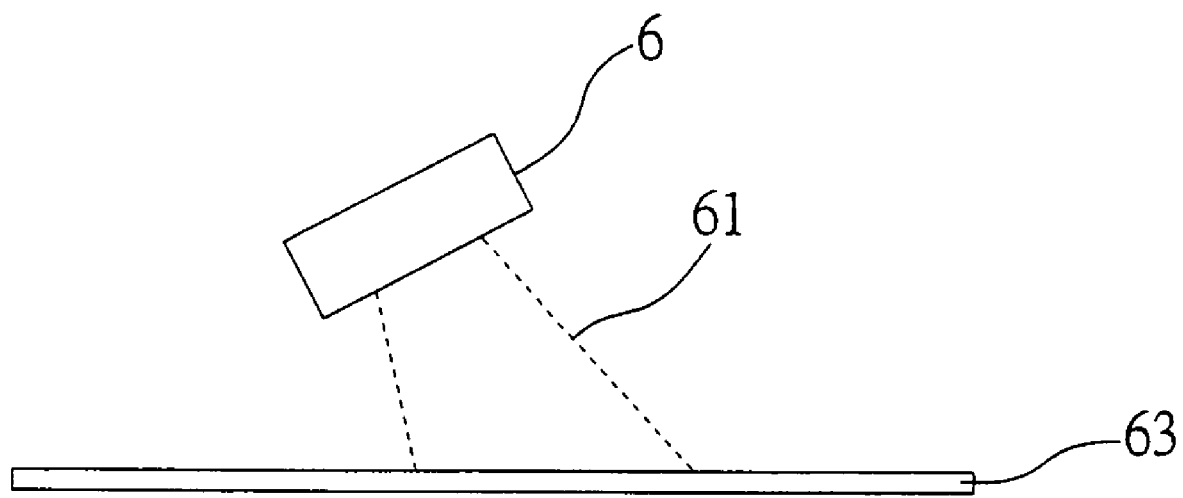
FIG. 8 (PRIOR ART) is a schematic view illustrating another known method for fabricating liquid crystal alignment.

Referring to FIG. 6, which is a schematic view showing a method for fabricating liquid crystal alignment and an alignment system applicable to the method in accordance with the fourth preferred embodiment of the present invention, the distinguishing features of the fourth preferred embodiment are as follows. The substrate delivering mechanism 13 is an axle, and the flexible substrates 3 are delivered by the outer surface of the axle, thus allowing the alignment film 33 of the delivered substrates 3 to be aligned by the plasma beams 155 generated by the peripherally disposed plasma generating devices 15. In other words, at the axle in the fourth preferred embodiment, the alignment film 33 of the substrates 3 is continuously aligned, and thus the structure of the substrate delivering mechanisms 13 can be made simpler, and therefore machinery miniaturization can be achieved. Also, the tilt angles at which the substrates 3 are disposed can be conveniently adjusted by rotating the axle.

Compared to the prior art, a method for fabricating liquid crystal alignment and an alignment system applicable to the method, as disclosed in the present invention, involve modifying the surface of an alignment film by a plurality of plasma generating devices disposed adjustably in direction and angle, aligning liquid crystal molecules at a high pretilt angle, such that the liquid crystal molecules of the alignment film are aligned uniformly and regularly and characterized by high anchoring energy and a high pretilt angle.

Insomuch as the surface of an alignment film is modified by a plurality of plasma generating devices, liquid crystal alignment is achieved in a single process. Hence, unlike the prior art which is faced with problems arising from scanning an alignment film back and forth, the present invention shortens and simplifies a process. In the present invention, liquid crystal alignment is achieved by means of a plurality of plasma generating devices (plasma beams) instead of by rubbing alignment, the present invention has two advantages. First, a high pretilt angle can be achieved by means of a small amount of energy. Second, stability is enhanced. Accordingly, the present invention solves the problems facing the prior art.

The aforesaid embodiments merely serve as the preferred embodiments of the present invention. They should not be construed as to limit the scope of the present invention in any way. Hence, any other changes can actually be made in the present invention. It will be apparent to those skilled in the art that all equivalent modifications or changes made, without departing from the spirit and the technical concepts disclosed by the present invention, should fall within the scope of the appended claims.

What is claimed is:

1. A method for fabricating an aligned liquid crystal (LC), comprising:
   forming an alignment film on a substrate, the alignment film having aligned liquid crystal molecules;
   arranging the substrate and a plurality of plasma generating devices such that the substrate surrounds the plasma generating devices, the plasma generating devices generating a plurality of plasma beams in adjustable directions and angles; and
   applying the plurality of plasma beams to the alignment film, so that the liquid crystal molecules are aligned uniformly and regularly, and have a high pretilt angle.

2. The method of claim 1, wherein the alignment film is one of an organic film and an inorganic film.

3. The method of claim 1, wherein the alignment film is an organic-inorganic hybrid film.

4. The method of claim 1, wherein the plasma generating devices generate the plasma beams by using a process gas selected from the group consisting of air, dry air, hydrogen, oxygen, nitrogen, argon, steam, and helium.

5. The method of claim 4, wherein the process gas is a gas ionized at a pressure ranging from a standard atmospheric pressure to a vacuum.

6. The method of claim 1, wherein the plasma beams are generated at a pressure ranging from 760 to $1\times10^{-5}$ Torr.

7. The method of claim 1, wherein the plasma beams comprise one selected from the group consisting of an electron, an ion, a radical, and a neutral particle.

8. The method of claim 1, wherein the plasma beams comprise at least two selected from the group consisting of an electron, an ion, a radical, and a neutral particle.

9. The method of claim 1, further comprises forming a conductive layer on the substrate.

10. The method of claim 9, wherein the conductive layer comprises indium tin oxide (ITO).

11. The method of claim 1, wherein the substrate is one selected from the group consisting of a glass substrate, a plastic substrate, and a flexible metal substrate.

12. The method of claim 1, wherein the liquid crystal molecules of the alignment film are aligned in a way selected from the group consisting of Vertical Alignment, Twisted Nematic (TN), Super Twisted Nematic (STN), Multi-domain Vertical Alignment (MVA), In-Plane Switching (IPS), Optical Compensated Bend (OCB), and Ferroelectric Liquid Crystal (FLC).

13. The method of claim 1, wherein the plasma beams are moved unidirectionally, and the alignment film is modified by the plasma beams provided adjustably in direction and angle.

14. The method of claim 1, wherein the plasma beams and the substrate are moved relatively to one another, and the alignment film is modified by the plasma beams provided adjustably in direction and angle.

15. The method of claim 1, wherein the plasma beams are moved unidirectionally for modifying the alignment film on the substrate disposed adjustably in direction and angle.

16. The method of claim 1, wherein the plasma beams and the substrate are moved relatively to one another, and the alignment film on the substrate disposed adjustably in direction and angle is modified.

* * * * *